Figure 1:
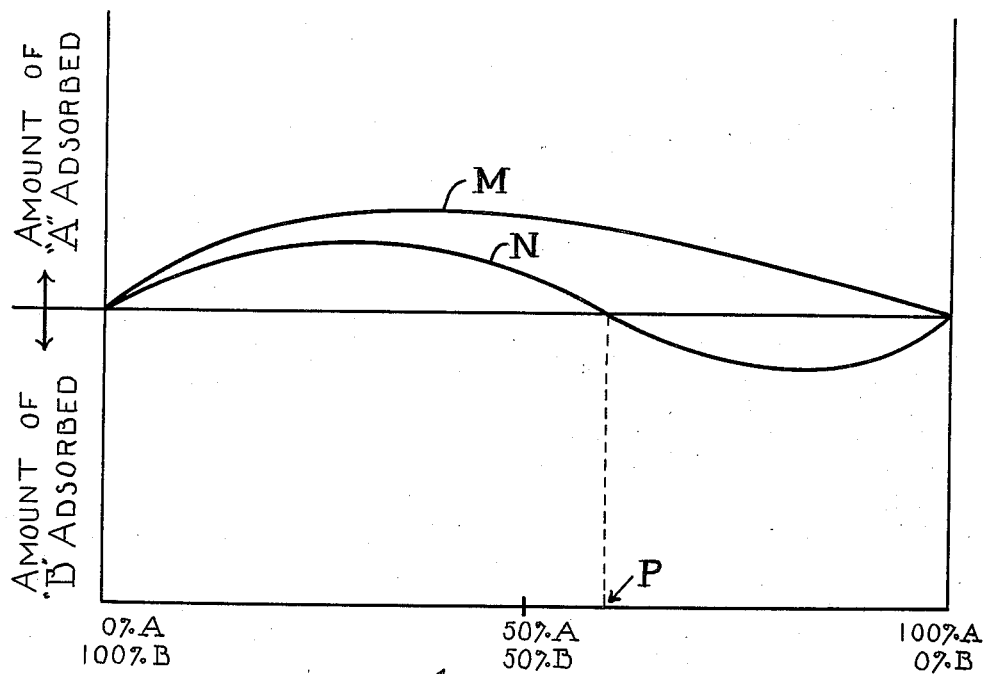

INVENTOR.
Alfred E. Hirschler
BY
Busser and Harding
ATTORNEYS

Patented June 7, 1949

2,472,250

UNITED STATES PATENT OFFICE 2,472,250

PROCESS FOR SEPARATING HYDROCARBONS BY ADSORPTION

Alfred E. Hirschler, Drexel Hill, Pa., assignor to Sun Oil Company, Philadelphia, Pa., a corporation of New Jersey Application October 3, 1946, Serial No. 700,925

14 Claims. (Cl. 260—666)

This invention relates to the separation of hydrocarbons by adsorption and particularly to a method for separating a mixture of hydrocarbons to obtain each hydrocarbon in relatively pure form. The procedure whereby this is accomplished involves the use of two different adsorbent materials in separate adsorption steps.

Methods are known for separating hydrocarbons by treating a mixture of the same with a granular adsorbent material such as silica gel or activated carbon to remove one or more of the hydrocarbons by selective adsorption. This procedure has been employed mainly for separating hydrocarbons according to chemical type where the different types of hydrocarbons concerned have greatly different adsorptive properties. Thus, adsorption methods have been utilized to remove unsaturated hydrocarbons such as olefins or aromatics from saturated hydrocarbons such as paraffins or naphthenes. As a general rule, the adsorptivity of hydrocarbons increases as the unsaturation or number of double bonds per molecule increases, so that an unsaturated hydrocarbon may readily be selectively adsorbed from a mixture containing the same together with a more saturated hydrocarbon.

It has generally been thought that hydrocarbons having the same degree of saturation would not exhibit any substantial difference in adsorbability, especially when the hydrocarbons are not greatly different in molecular weight. For example, it has been generally considered that two paraffin hydrocarbons, or two naphthenes, would have so nearly the same adsorbability as not to be separable by adsorption and especially so when the hydrocarbons are isomers or adjacent homologues. Likewise, the adsorption method has been presumed to be ineffective to separate two olefins having the same number of double bonds per molecule, or two aromatics having the same number of aromatic rings or double bonds per molecule.

More recently, however, it has been found that the separation of hydrocarbons having the same degree of saturation may be effected by selective adsorption, employing either silica gel or activated carbon as the adsorbent, so as to obtain one of the components in relatively pure form. Methods for accomplishing such separations have been described and claimed in my co-pending applications as follows: Serial Nos. 643,762, now abandoned, 643,763, now U. S. Patent No. 2,448,488, and 643,764, now U. S. Patent No. 2,464,931, filed January 26, 1946; Serial No. 660,076, filed April 6, 1946, now abandoned, and Serial Nos. 672,683, now abandoned, 672,684, now abandoned, 672,685 and 672,686, filed May 27, 1946. These methods are capable of producing, in relatively pure form, that component of the starting mixture which is least adsorbable under the conditions of treatment. In other words, the adsorption treatment will yield a filtrate fraction of high purity. It is difficult, however, and with many hydrocarbon pairs it is impossible, to obtain the more adsorbable component in high purity. Thus, while such methods may be used to produce one of the components in relatively pure form, they are not generally suitable for obtaining both components in highly purified form.

The present invention provides a method whereby both components of the starting mixture may be obtained in relatively pure form. The method is based upon the fact that two hydrocarbons having the same degree of saturation (measured by the number of double bonds per molecule) usually will form a mixture from which, within a certain definite concentration range, one of the components will be the more adsorbable on silica gel while the other component will be the more adsorbable on activated carbon. This is especially the case where the hydrocarbons are isomers or adjacent homologues, but it also obtains in many cases where the hydrocarbons are of different chemical type as where one is a naphthene and the other a paraffin hydrocarbon. The method involves the use of both silica gel and activated carbon in successive adsorption steps, whereby in the first step one of the hydrocarbons is selectively adsorbed whereas in the next step the other hydrocarbon is selectively adsorbed. This permits each hydrocarbon to be obtained as a filtrate fraction in highly purified form.

According to the invention, the procedure comprises treating a starting mixture of the hydrocarbons, A and B, with one of the adsorbents, preferably by filtering the mixture through a column containing the adsorbent, to selectively adsorb (say) the A component. Preferably, the adsorbent first used should be the one which has the greater selectivity at the starting mixture composition. From this treatment there is obtained a filtrate fraction containing the B component in more nearly pure form. There is also obtained (by employing a desorbing agent as hereinafter described) an adsorbate fraction containing both A and B in a proportion falling within that certain definite concentration range at which the A component, although being the more adsorbable on the first adsorbent, is the least adsorbable on the second adsorbent. This adsorbate fraction is then treated with the second adsorbent to selectively remove the B component and yield a filtrate containing the A component in more nearly purified form. In this manner each component may be obtained in a relatively pure state.

For a better understanding of the applicability of the present invention, reference should be made to the accompanying drawings which illustrate the types of adsorption behavior exhibited by pairs of hydrocarbons which are separable in accordance with the present method. Each figure depicts the adsorption isotherms obtained for a pair of hydrocarbons throughout the full composition range of 0 to 100% for each hydrocarbon. In each figure one of the curves represents the adsorption isotherm obtained with one of the adsorbents; and the other curve represents the adsorption isotherm obtained with the other adsorbent. As is well known, the adsorption isotherms show the relationship between composition of the mixture at equilibrium with a given amount of adsorbent and the amount of component adsorbed. (The latter value is the "apparent" amount as customarily calculated from the change in composition of the mixture before and after adsorption assuming no adsorption of the other component.)

Figure 1 represents the type of behavior where one of the hydrocarbons is preferentially adsorbed by one of the adsorbents throughout substantially the whole concentration range; but where the other adsorbent selectively removes that particular component only throughout a certain part of the concentration range while selectively adsorbing the other component throughout the rest of the concentration range. Thus, assuming that curve M represents the adsorption isotherm for (say) activated carbon, it may be seen that activated carbon will selectively adsorb hydrocarbon A from mixtures of A and B substantially regardless of how much A is present in the mixture. Therefore, starting with a mixture of A and B of any composition, B may be obtained in purified form by treating the mixture with activated carbon to selectively adsorb A and thereby obtaining B as a filtrate fraction of high purity. Theoretically it would also be possible to obtain hydrocarbon A in pure form by using a large amount of adsorbent to treat the charge mixture, then displacing the adsorbate by means of a desorbing agent and obtaining the last portion of displaced adsorbate. But as a practical matter, it has been found to be extremely difficult to obtain, in this manner, the more adsorbable component in relatively pure form.

Again, assuming that curve N of Figure 1 represents the adsorption isotherm for the same two hydrocarbons but with silica gel as the adsorbent, it may be seen that when A and B are present in the proportion represented by P the two hydrocarbons would exhibit no difference in adsorbability on silica gel and therefore would not be separable by means of this adsorbent. But if the starting mixture contained A in a concentration substantially below that at P, the silica gel would selectively adsorb the A component so that a filtrate fraction containing B in relatively pure form could be obtained. However, in desorbing the adsorbate portion from the gel it would be impossible to obtain A in a concentration greater than that represented by P. On the other hand, if the starting mixture contained A in a concentration substantially above that at P, the silica gel would selectively adsorb the B component so that A could be obtained as a filtrate of high purity; but it would be impossible in this treatment to obtain B in a concentration greater than that represented by P.

It is thus evident that with a hydrocarbon system as illustrated in Figure 1, it would be either extremely difficult or impossible to obtain both hydrocarbons in relatively pure form by treating the starting mixture with only one of the adsorbents. The following hydrocarbon pairs are examples of mixtures which exhibit behavior of this type:

n-Heptane-methylcyclohexane
n-Octane-ethylcyclohexane
n-Octane-2,2,4-trimethylpentane The first-named compound in each case is equivalent to the A component of Figure 1 and is preferentially adsorbable by activated carbon at substantially all concentrations. Usually, with hydrocarbon pairs which exhibit the type of behavior illustrated by Figure 1, activated carbon is the adsorbent which preferentially adsorbs one of the components throughout the whole concentration range while silica gel is the adsorbent which gives the S-type adsorption isotherm.

Mixtures of this type may be treated according to the present method to obtain both A and B in relatively pure form. By way of example, the system n-heptane-methylcyclohexane may be taken. With these hydrocarbons activated carbon gives the type of adsorption isotherm shown by curve M; while silica gel gives the type shown by curve N, with neither component being preferentially adsorbed when the mixture contains about 58% n-heptane by volume. Assuming that the starting mixture contained 58% n-heptane, this mixture would be treated first with activated carbon to selectively adsorb the n-heptane and to obtain a filtrate fraction containing methylcyclohexane in relatively pure form and an adsorbate fraction containing n-heptane in a concentration substantially greater than 58%. The last-named fraction would then be treated with silica gel to selectively absorb methylcyclohexane and give a filtrate fraction containing n-heptane in relatively pure form.

The same procedure would be followed if the starting mixture contained less than 58% n-heptane. On the other hand, if the starting mixture contained more than 58% n-heptane, either adsorbent could be used first. In this case, however, it generally would be preferable to treat the charge first with silica gel to selectively adsorb methylcyclohexane and yield a filtrate fraction containing n-heptane in high purity and an adsorbate fraction containing n-heptane in a concentration less than in the starting mixture and not greatly different from the concentration at P (i. e. not greatly above 58%). The adsorbate fraction would then be treated with activated carbon to selectively adsorb the n-heptane and yield a filtrate fraction containing methylcyclohexane in high purity. The resulting adsorbate may be retreated, if desired, to effect further separation of the components.

Figure 2:
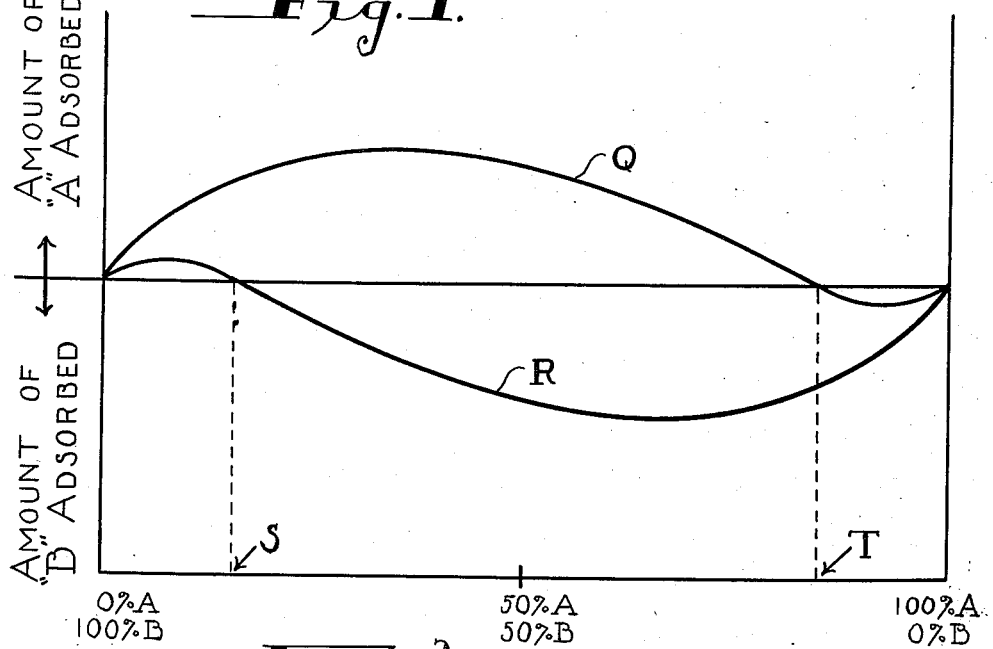

Figure 2 is illustrative of another type of behavior which some pairs of hydrocarbons having the same degree of unsaturation exhibit. With mixtures of this type, one of the adsorbents will selectively adsorb component A throughout a major portion of the composition range and will selectively adsorb component B only when it is present in minor amount less than a certain definite concentration, as illustrated by curve Q. The other adsorbent will have a reverse effect, so that it will selectively adsorb component B over a major part of the composition range while preferentially adsorbing component A only when it is present in minor amount below a certain definite concentration, as illustrated by curve R. Any mixture of the two components falling within the composition range between points S and T may be treated either with activated carbon to obtain one of the components as a relatively pure filtrate or with silica gel to obtain the other component relatively pure. Therefore, by producing in the first treating step an adsorbate fraction having a concentration within this range, this fraction may then be effectively treated by means of the other adsorbent. Thus, by starting with a mixture of the components in any given proportion and treating the mixture preferably with that adsorbent which is the more selective at the starting mixture composition, there may be obtained a filtrate fraction containing one of the components in relatively pure form and an adsorbate fraction having a composition within the range between S and T. This adsorbate may then be treated with the other adsorbent to obtain the other component in relatively pure form.

An example of a hydrocarbon pair which behaves as illustrated in Figure 2 is 2,3-dimethylpentane and 2,4-dimethylpentane. These hydrocarbons, with silica gel as the adsorbent, give an adsorption isotherm similar to curve R, with the point of no preferential adsorption occurring when the concentration of the 2,3-dimethylpentane is about 10% by volume. With activated carbon the adsorption isotherm is similar to curve Q, with the point of no selectivity occurring when the 2,3-dimethylpentane content is about 95%. These hydrocarbons thus may be effectively separated according to the present method to obtain each component in highly pure form.

In practicing the process, each adsorption treatment is carried out preferably by percolating the charge through a column containing a relatively large amount of the adsorbent. After all of the charge has passed into the adsorbent, it may be followed by a desorbing agent comprising a liquid more strongly adsorbable than the adsorbate to effect its displacement. Polar organic liquids, such as alcohol or acetone, are particularly suitable for desorbing silica gel. Aryl compounds, such as benzene, toluene, xylene, phenol or the like, may be used to desorb activated carbon. Aromatic hydrocarbons may also be used to desorb silica gel when the adsorbate comprises saturated hydrocarbons. The desorbing agent should be so selected with respect to boiling point that it will be readily separable from the desorbed hydrocarbons by distillation. In each treating step the efflux from the column may be collected in separate fractions as desired in order to segregate those portions having the desired purity. In case the desired purity is not attained in one treatment, the filtrate may be retreated with fresh adsorbent.

The temperature at which the adsorption operation is carried out may affect the efficiency of the separation and it often will be the case that a poorer separation will be obtained at elevated temperature. The operation therefore is preferably conducted at room temperature or below to insure a better separation. This generally will necessitate the provision of some means for removing any heat generated due to wetting of the adsorbent as, for instance, by providing means for circulating a cooling medium around the adsorbent column.

As an example, the present process was used to separate a mixture containing 58% n-heptane and 42% methylcyclohexane. This mixture exhibits no difference in adsorbability of the components on silica gel. The mixture was passed into a column of activated carbon at a temperature of about 12° C. to selectively adsorb the n-heptane and was followed with ethylbenzene as a desorbing agent. The efflux was segregated into a series of fractions of decreasing methylcyclohexane content, the first fraction containing about 81% methylcyclohexane. The thus obtained fractions rich in methylcyclohexane were retreated by percolation through a column of fresh carbon in similar manner, and the first filtrate fraction then obtained was 99.8% pure methylcyclohexane. The latter portions of efflux from the first treatment comprised the adsorbate enriched with respect to n-heptane. The last fraction of adsorbate contained about 83% n-heptane while preceding fractions had progressively lower n-heptane contents. These fractions were then treated with silica gel by percolation through a column of this adsorbent, also at about 12° C., in the reverse order from which they had been obtained from the previous operation or, in other words, in the order of decreasing n-heptane content. The last fraction was followed by ethyl alcohol as a desorbing agent. The efflux was segregated into a series of fractions which were then subjected, in the order obtained, to another treatment with fresh silica gel. Alcohol was again added as the desorbing agent. The first fraction from this treatment had a n-heptane content of about 97%, with succeeding fractions containing progressively lower percentages of n-heptane. These fractions were again treated, in the order obtained, by percolation through another batch of fresh silica gel, and a filtrate fraction was thereby obtained which was substantially 100% pure n-heptane. The procedure thus produced, from a starting mixture of two C₇ hydrocarbons, each component in extremely pure form.

While the invention has been illustrated with reference to certain specific hydrocarbons, it is by no means limited thereto but may be applied to the separation of any pair of hydrocarbons which, when admixed in proportions within a certain definite concentration range, form a mixture from which one of the hydrocarbons is the more adsorbable component on silica gel while the other hydrocarbon is the more adsorbable component on activated carbon.

Having described my invention, what I claim and desire to protect by Letters Patent is:

1. In an adsorption method for separating two hydrocarbons, A and B, having the same degree of saturation by selective adsorption employing both activated carbon and silica gel as adsorbents, which hydrocarbons form a mixture from which A and B have the same adsorbability on one of the said adsorbents when the proportion of A to B is a certain definite proportion but from which A is more adsorbable than B on the other of said adsorbents at all proportions of A to B below, and up to a proportion at least substantially exceeding, said certain definite proportion, the steps which comprise first treating a mixture of the hydrocarbons in liquid phase with one of said adsorbents to selectively adsorb one of the components, the first treatment being with the aforesaid other of said adsorbents when the proportion of A to B is below, or not substantially different from, said certain definite proportion, thereby obtaining a filtrate fraction containing the other component in more nearly pure form and an adsorbate fraction containing the two hydrocarbons in a proportion between said certain definite proportion and said proportion at least substantially exceeding said certain definite proportion, then treating said adsorbate fraction in liquid phase with the adsorbent which was not used in the first treatment, to selectively adsorb the other component and thereby obtaining a filtrate fraction containing the component which was selectively adsorbed in the first treatment in more nearly pure form.

2. Method according to claim 1 wherein the adsorbent used in the first treatment is activated carbon and the adsorbent used in the second treatment is silica gel.

3. Method according to claim 1 wherein the adsorbent used in the first treatment is silica gel and the adsorbent used in the second treatment is activated carbon.

4. In an adsorption method for separating two hydrocarbons, A and B, having the same degree of saturation by selective adsorption, which hydrocarbons form a mixture from which A and B have the same adsorbability on silica gel when the proportion of A to B is a certain definite proportion but from which A is more adsorbable than B on activated carbon at all proportions of A to B below, and at least up to a proportion substantially exceeding, said certain definite proportion, the steps which comprise first treating a mixture of the hydrocarbons containing a proportion of A to B less than said proportion substantially exceeding said certain definite proportion in liquid phase with activated carbon to selectively adsorb A, thereby obtaining a filtrate fraction containing B in more nearly pure form and an adsorbate fraction containing the two hydrocarbons in a proportion exceeding said certain definite proportion, then treating said adsorbate fraction in liquid phase with silica gel to selectively adsorb B and thereby obtaining a filtrate fraction containing A in more nearly pure form.

5. In an adsorption method for separating two hydrocarbons, A and B, having the same degree of saturation by selective adsorption, which hydrocarbons form a mixture from which A and B have the same adsorbability on activated carbon when the proportion of A to B is a certain definite proportion but from which A is more adsorbable than B on silica gel at all proportions of A to B below, and at least up to a proportion substantially exceeding said certain definite proportion, the steps which comprise first treating a mixture of the hydrocarbons containing a proportion of A to B less than said proportion substantially exceeding said certain definite proportion in liquid phase with silica gel to selectively adsorb A, thereby obtaining a filtrate fraction containing B in more nearly pure form and an adsorbate fraction containing the two hydrocarbons in a proportion exceeding said certain definite proportion, then treating said adsorbate fraction in liquid phase with activated carbon to selectively adsorb B and thereby obtaining a filtrate fraction containing A in more nearly pure form.

6. In an adsorption method for separating two hydrocarbons, A and B, having the same degree of saturation by selective adsorption, which hydrocarbons form a mixture from which A and B have the same adsorbability on silica gel when the proportion of A to B is a certain definite proportion but from which A is more adsorbable than B on activated carbon at all proportions of A to B, the steps which comprise first treating a mixture of the hydrocarbons containing a proportion of A to B exceeding said certain definite proportion in liquid phase with activated carbon to selectively adsorb A, thereby obtaining a filtrate fraction containing B in more nearly pure form and an adsorbate fraction, then treating said adsorbate fraction in liquid phase with silica gel to selectively adsorb B and thereby obtaining a filtrate fraction containing A in more nearly pure form.

7. In an adsorption method for separating two hydrocarbons, A and B, having the same degree of saturation by selective adsorption, which hydrocarbons form a mixture from which A and B have the same adsorbability on silica gel when the proportion of A to B is a certain definite proportion but from which A is more adsorbable than B on activated carbon at all proportions of A to B, the steps which comprise first treating a mixture of the hydrocarbons containing a proportion of A to B exceeding said certain definite proportion in liquid phase with silica gel to selectively adsorb B, thereby obtaining a filtrate fraction containing A in more nearly pure form and an adsorbate fraction, then treating said adsorbate fraction in liquid phase with activated carbon to selectively adsorb A and thereby obtaining a filtrate fraction containing B in more nearly pure form.

8. In an adsorption method for separating two hydrocarbons, A and B, having the same degree of saturation by selective adsorption, which hydrocarbons form a mixture from which A and B have the same adsorbability on activated carbon when the proportion of A to B is a certain definite proportion but from which A is more adsorbable than B on silica gel at all proportions of A to B, the steps which comprise first treating a mixture of the hydrocarbons containing a proportion of A to B exceeding said certain definite proportion in liquid phase with silica gel to selectively adsorb A, thereby obtaining a filtrate fraction containing B in more nearly pure form and an adsorbate fraction, then treating said adsorbate fraction in liquid phase with activated carbon to selectively adsorb B and thereby obtaining a filtrate fraction containing A in more nearly pure form.

9. In an adsorption method for separating two hydrocarbons, A and B, having the same degree of saturation by selective adsorption, which hydrocarbons form a mixture from which A and B have the same adsorbability on activated carbon when the proportion of A to B is a certain definite proportion but from which A is more adsorbable than B on silica gel at all proportions of A to B, the steps which comprise first treating a mixture of the hydrocarbons containing a proportion of A to B exceeding said certain definite proportion in liquid phase with activated carbon to selectively adsorb B, thereby obtaining a filtrate fraction containing A in more nearly pure form and an adsorbate fraction, then treating said adsorbate fraction in liquid phase with silica gel to selectively adsorb A and thereby obtaining a filtrate fraction containing B in more nearly pure form.

10. In an adsorption method for separating two hydrocarbons, A and B, having the same degree of saturation by selective adsorption employing both activated carbon and silica gel as adsorbents, which hydrocarbons form a mixture from which A and B have the same adsorbability on one of the said adsorbents when the proportion of A to B is a certain definite proportion and from which A and B have the same adsorbability on the other of said adsorbents at a certain higher proportion of A to B, the steps which comprise first treating a mixture of the hydrocarbons in liquid phase with one of the adsorbents to selectively adsorb one of the components, the first treatment being with the adsorbent on which A and B have the same adsorbability at said certain higher proportion when the proportion of A to B in the mixture is below, or not substantially different from, said certain definite proportion and being with the adsorbent on which A and B have the same adsorbability at said certain definite proportion when the proportion of A to B in the mixture is above, or not substantially different from, said certain higher proportion, thereby obtaining a filtrate fraction containing the other component in a more nearly pure form and an adsorbate fraction containing the two hydrocarbons in a proportion between said certain definite proportion and said certain higher proportion, then treating said adsorbate fraction in liquid phase with the adsorbent which was not used in the first treatment, to selectively adsorb the other component and thereby obtaining a filtrate fraction containing the component which was selectively adsorbed in the first treatment in a more nearly pure form.

11. Method according to claim 10 wherein the adsorbent used in the first treatment is activated carbon and the adsorbent used in the second treatment is silica gel.

12. Method according to claim 10 wherein the adsorbent used in the first treatment is silica gel and the adsorbent used in the second treatment is activated carbon.

13. In an adsorption method for separating two hydrocarbons, A and B, having the same degree of saturation by selective adsorption, which hydrocarbons form a mixture from which A and B have the same adsorbability on silica gel when the proportion of A to B is a certain definite proportion and from which A and B have the same adsorbability on activated carbon at a certain higher proportion of A to B, the steps which comprise first treating a mixture of the hydrocarbons in which the proportion of A to B is between said certain definite proportion and said certain higher proportion in liquid phase with activated carbon to selectively adsorb A, thereby obtaining a filtrate fraction containing B in more nearly pure form and an adsorbate fraction, then treating said adsorbate fraction in liquid phase with silica gel to selectively adsorb B and thereby obtaining a filtrate fraction containing A in more nearly pure form.

14. In an adsorption method for separating two hydrocarbons, A and B, having the same degree of saturation by selective adsorption, which hydrocarbons form a mixture from which A and B have the same adsorbability on silica gel when the proportion of A to B is a certain definite proportion and from which A and B have the same adsorbability on activated carbon at a certain higher proportion of A to B, the steps which comprise first treating a mixture of the hydrocarbons in which the proportion of A to B is between said certain definite proportion and said certain higher proportion in liquid phase with silica gel to selectively adsorb B, thereby obtaining a filtrate fraction containing A in more nearly pure form and an adsorbate fraction, then treating said adsorbate fraction in liquid phase with activated carbon to selectively adsorb A and thereby obtaining a filtrate fraction containing B in more nearly pure form.

ALFRED E. HIRSCHLER.

REFERENCES CITED

The following references are of record in the file of this patent:

UNITED STATES PATENTS

| Number | Name | Date |
|---|---|---|
| 1,614,615 | Jannek | Jan. 18, 1927 |
| 2,306,610 | Barrer | Dec. 29, 1942 |
| 2,376,425 | Frey | May 22, 1945 |
| 2,384,311 | Kearby | Sept. 4, 1945 |
| 2,398,101 | Lipkin | Apr. 9, 1946 |
| 2,425,535 | Hibshman | Aug. 12, 1947 |